(12) United States Patent
Yoon et al.

(10) Patent No.: US 10,011,162 B2
(45) Date of Patent: *Jul. 3, 2018

(54) POWER SWITCHING MODULE FOR BATTERY MODULE ASSEMBLY

(75) Inventors: Junill Yoon, Daejeon (KR); Jong-yul Ro, Daejeon (KR); Heekook Yang, Daejeon (KR); Jongmoon Yoon, Daejeon (KR); Do Yang Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 661 days.

This patent is subject to a terminal disclaimer.

(21) Appl. No.: 13/357,705

(22) Filed: Jan. 25, 2012

(65) Prior Publication Data

US 2012/0183820 A1    Jul. 19, 2012

Related U.S. Application Data

(63) Continuation of application No. 12/516,267, filed as application No. PCT/KR2007/005337 on Oct. 27, 2007, now Pat. No. 8,125,192.

(30) Foreign Application Priority Data

Nov. 27, 2006 (KR) .......................... 10-2006-0117317

(51) Int. Cl.
  *H01M 2/10* (2006.01)
  *B60K 6/28* (2007.10)
  (Continued)

(52) U.S. Cl.
  CPC ............. *B60K 6/28* (2013.01); *H01M 2/0245* (2013.01); *H01M 2/1077* (2013.01); *H01M 2/206* (2013.01)

(58) Field of Classification Search
  CPC .. H01M 2/0245; H01M 2/0247; H01M 2/206; H01M 2/1077; B60K 6/28
  (Continued)

(56) References Cited

U.S. PATENT DOCUMENTS 6,275,003 B1    8/2001  Marukawa et al.
6,411,063 B1 *  6/2002  Kouzu .................. B60L 3/0046
                                                    320/150

(Continued)

FOREIGN PATENT DOCUMENTS

JP    2000-48867 A    2/2000
JP    2001-176472 A   6/2001

(Continued)

*Primary Examiner* — Nicholas P D'Aniello
*Assistant Examiner* — Philip A. Stuckey
(74) *Attorney, Agent, or Firm* — Birch, Stewart, Kolasch & Birch, LLP

(57) ABSTRACT

Disclosed is a power switching module for a battery module assembly in which a plurality of rectangular battery modules, each having a plurality of battery cells or unit modules connected in series to each other, are stacked in the width (longitudinal) and height (transverse) direction by at least twos such that the battery modules constitute a hexahedral structure (hexahedral stack), outer edges of the hexahedral stack are fixed by a frame member, and input and output terminals of the battery modules are oriented such that the input and output terminals of the battery modules are directed toward one surface (a) of the stack, wherein the power switching module comprises an insulative substrate mounted to the surface (a) of the stack, elements mounted on the substrate for controlling voltage and current during charge and discharge of the battery modules, and connection members mounted on the substrate for interconnecting the control elements.

18 Claims, 8 Drawing Sheets

(51) Int. Cl.
   *H01M 2/02*   (2006.01)
   *H01M 2/20*   (2006.01)
(58) Field of Classification Search
   USPC .................................................. 429/163, 153
   See application file for complete search history.

(56) References Cited

U.S. PATENT DOCUMENTS

| | | | |
|---|---|---|---|
| 6,472,098 B1 | | 10/2002 | Sawada et al. |
| 6,475,659 B1 | * | 11/2002 | Heimer ............... H01M 2/0262 |
| | | | 429/130 |
| 6,482,541 B1 | * | 11/2002 | Bator, Jr. ............ H01M 2/1077 |
| | | | 429/100 |
| 6,541,154 B2 | * | 4/2003 | Oogami et al. ................ 429/159 |
| 6,635,380 B1 | * | 10/2003 | Shimoda et al. ................ 429/93 |
| 7,291,421 B2 | | 11/2007 | Kimura et al. |
| 7,858,229 B2 | | 12/2010 | Shin et al. |
| 7,898,263 B2 | | 3/2011 | Ishida et al. |
| 2004/0021442 A1 | * | 2/2004 | Higashino ......... H01M 10/0413 |
| | | | 320/112 |
| 2005/0202311 A1 | * | 9/2005 | Higashino et al. ............. 429/99 |
| 2005/0287400 A1 | * | 12/2005 | Cho .................... H01M 2/0247 |
| | | | 429/7 |
| 2006/0127754 A1 | | 6/2006 | Hamada et al. |
| 2007/0141457 A1 | | 6/2007 | Amagai |

FOREIGN PATENT DOCUMENTS

| | | | | | |
|---|---|---|---|---|---|
| JP | 2002-42763 A | | 2/2002 | | |
| JP | 2002-190288 A | | 7/2002 | | |
| JP | 2002-289161 A | | 10/2002 | | |
| JP | 2002289161 A | * | 10/2002 | ............. | H01M 2/10 |
| JP | 2002-367666 A | | 12/2002 | | |
| JP | 2002367666 A | * | 12/2002 | ............. | H01M 8/24 |
| JP | 2003-257505 A | | 9/2003 | | |
| JP | 2003-317812 A | | 11/2003 | | |
| JP | 2004-273428 A | | 9/2004 | | |
| JP | 2005-209367 A | | 8/2005 | | |
| JP | 2005-209369 A | | 8/2005 | | |
| JP | 2005209367 A | * | 8/2005 | ............ | H01M 10/50 |
| JP | 2006-306376 A | | 11/2006 | | |
| WO | WO 2006/043163 A1 | | 4/2006 | | |
| WO | WO 2006043163 A1 | * | 4/2006 | | |
| WO | WO 2006/068366 A1 | | 6/2006 | | |

* cited by examiner

POWER SWITCHING MODULE FOR BATTERY MODULE ASSEMBLY

This application is a Continuation of application Ser. No. 12/516,267 filed Feb. 24, 2010 now U.S. Pat. No. 8,125,192, which is the National phase of PCT International Application No. PCT/KR2007/005337 filed on Oct. 27, 2007. This application also claims priority to Patent Application No. 10-2006-0117317 filed in the Republic of Korea on Nov. 27, 2006, all of which are hereby expressly incorporated by reference into the present application.

FIELD OF THE INVENTION

The present invention relates to a power switching module for battery module assemblies, and, more particularly, to a power switching module for a battery module assembly constructed in a structure in which a plurality of rectangular battery modules, each having a plurality of battery cells or unit modules connected in series to each other, are stacked in the width direction (the longitudinal direction) and the height direction (the transverse direction) by at least twos such that the rectangular battery modules generally constitute a hexahedral structure (hexahedral stack), outer edges of the hexahedral stack are fixed by a frame member, and input and output terminals of the rectangular battery modules are oriented such that the input and output terminals of the rectangular battery modules are directed toward one surface (a) of the hexahedral stack, wherein the power switching module comprises an insulative substrate mounted to the surface (a) of the hexahedral stack in a coupling fashion, elements mounted on the insulative substrate for controlling voltage and current during the charge and discharge of the rectangular battery modules, and connection members mounted on the insulative substrate for interconnecting the control elements.

BACKGROUND OF THE INVENTION

Recently, a secondary battery, which can be charged and discharged, has been widely used as an energy source for wireless mobile devices. Also, the secondary battery has attracted considerable attention as a power source for electric vehicles (EV) and hybrid electric vehicles (HEV), which have been developed to solve problems, such as air pollution, caused by existing gasoline and diesel vehicles using fossil fuel.

Small-sized mobile devices use one or several battery cells for each device. On the other hand, middle- or large-sized devices, such as vehicles, use a middle- or large-sized battery module having a plurality of battery cells electrically connected with each other because high output and large capacity are necessary for the middle- or large-sized devices.

Preferably, the middle- or large-sized battery module is manufactured with small size and small weight if possible. For this reason, a prismatic battery or a pouch-shaped battery, which can be stacked with high integration and has a small weight to capacity ratio, is usually used as a battery cell of the middle- or large-sized battery module. Especially, much interest is currently generated in the pouch-shaped battery, which uses an aluminum laminate sheet as a sheathing member, because the weight of the pouch-shaped battery is small, the manufacturing costs of the pouch-shaped battery are low, and it is easy to modify the shape of the pouch-shaped battery.

For the middle- or large-sized battery module to provide output and capacity required by a predetermined apparatus or device, it is necessary for the middle- or large-sized battery module to be constructed in a structure in which a plurality of battery cells are electrically connected in series with each other, and the battery cells are stable against an external force.

Consequently, when a middle- or large-sized battery module is constructed using a plurality of battery cells, a plurality of members for mechanical coupling and electrical connection between the battery cells are generally needed, and, as a result, a process for assembling the mechanical coupling and electrical connection members is very complicated. Furthermore, there is needed a space for coupling, welding, or soldering the mechanical coupling and electrical connection members, with the result that the total size of the system is increased. The increase in size of the system is not preferred in the aspect of the spatial limit of an apparatus or device in which the middle- or large-sized battery module is mounted. Furthermore, the middle- or large-sized battery module must be constructed in a more compact structure in order that the middle- or large-sized battery module is effectively mounted in a limited inner space, such as a vehicle.

In addition, a power switching module used to manufacture the middle- or large-sized battery module includes a plurality of control elements for withdrawing electricity of the battery module to the outside. As a result, the structure of the power switching module is very complicated, and it is difficult to assembly the power switching module.

Consequently, there is a high necessity for a power switching module, used in a battery module assembly, which has an optimum arrangement structure suitable to a specific structure of the battery module assembly such that the power switching module can be electrically or mechanically coupled to the battery module assembly while the power switching module is structurally stable.

SUMMARY OF THE INVENTION

Therefore, the present invention has been made to solve the above problems, and other technical problems that have yet to be resolved.

Specifically, it is an object of the present invention to provide a power switching module for battery module assemblies, which has an optimum compact arrangement structure in which the power switching module is stably mounted in a limited space of a vehicle while the power switching module has a minimum space occupation, which is easily assembled, and which has a high structural stability against external impacts.

In accordance with one aspect of the present invention, the above and other objects can be accomplished by the provision of a power switching module for a battery module assembly constructed in a structure in which a plurality of rectangular battery modules, each having a plurality of battery cells or unit modules connected in series to each other, are stacked in the width direction (the longitudinal direction) and the height direction (the transverse direction) by at least twos such that the rectangular battery modules generally constitute a hexahedral structure (hexahedral stack), outer edges of the hexahedral stack are fixed by a frame member, and input and output terminals of the rectangular battery modules are oriented such that the input and output terminals of the rectangular battery modules are directed toward one surface (a) of the hexahedral stack, wherein the power switching module comprises an insulative substrate mounted to the surface (a) of the hexahedral stack in a coupling fashion, elements mounted on the insulative substrate for controlling voltage and current during the charge and discharge of the rectangular battery modules ('control elements'), and connection members mounted on the insulative substrate for interconnecting the control elements.

For example, the control elements, which prevent overcurrent and overvoltage, during the charge and discharge of the battery modules, and controls electricity such that the battery modules are stably operated, and the connection members, which interconnect the control elements, may be referred to as a power switching module (PSM), which is an element required to construct a middle- or large-sized battery module assembly.

According to the present invention, the PCM is mounted at the surface of the battery module assembly where the input and output terminals of the battery modules are located while the PSM is placed on the substrate. Consequently, the electrical connection structure is further simplified, and therefore, the assembly process is further simplified. Also, the length of the electrical connection unit is reduced, and therefore, the increase of the internal resistance is prevented. In addition, a possibility of a short circuit at the connection unit due to external impacts is reduced. Furthermore, the input and output terminals, which have a strong possibility of a short circuit occurring and are structurally weak, are protected from external environment.

Preferably, the PSM is constructed in a structure in which the PSM has a size approximately similar to one side of the battery module assembly such that the PSM can be appropriately mounted to a predetermine region of the battery module assembly, and the PSM is mounted to the respective input and output terminals of the rectangular battery modules constituting the battery module assembly in a coupling fashion such that the electrical connection between the PSM and the input and output terminals of the rectangular battery modules is accomplished.

The kinds of the control elements constituting the PSM may be various. In a preferred embodiment, the control elements include a main relay for automatically interrupting overcurrent and overvoltage in a reversible fashion, a free charge relay connected to the main relay according to priority, during the initial discharge process, for dropping voltage and current to prevent electricity having a high voltage from being abruptly supplied to a motor and an electric device of a vehicle, a resistance connected to the free charge relay for reducing current and voltage, a service plug located on the route of a cathode or anode circuit for manually interrupting electricity when it is necessary to conform the operation of the battery modules and repair the battery modules, and a current sensor for detecting current on a cathode or anode connection circuit and transmitting the detected current to a battery management system (BMS). These control elements appropriately control the voltage and current of electricity generated according to the charge and discharge of the battery modules.

The hexahedral stack of the battery modules may be constructed in various structures depending upon the stack shape of the rectangular battery modules, constituting the hexahedral stack. Preferably, the hexahedral stack of the rectangular battery modules is constructed in a structure in which two rectangular battery modules are arranged in the transverse direction, such that the rectangular battery modules are opposite to each other, and one or more rectangular battery modules are arranged in the longitudinal direction with respect to the respective rectangular battery modules.

In the above description, "the opposite arrangement" means that the corresponding regions of the two rectangular battery modules face each other. For example, when each rectangular battery module is constructed in a structure in which the input and output terminals are located at one side of each rectangular battery module, the rectangular battery modules are arranged opposite to each other such that the input and output terminals of the rectangular battery modules may be directed toward the side (a) of the hexahedral stack. This opposite arrangement structure has an advantage to further simplify the construction for electrical connection.

Preferably, the battery cells or the unit modules in the respective rectangular battery modules are arranged in parallel to a pair of opposite surfaces (b, c) of the hexahedral stack, in order to accomplish a high spatial utilization. In this case, therefore, the rectangular battery modules are arranged in parallel to the opposite surfaces (b, c) of the hexahedral stack. A coolant flows through gaps defined between the respective rectangular battery modules to effectively remove heat generated from the battery cells during the charge and discharge of the battery cells.

On the other hand, the frame member, which fixes the rectangular battery modules, fixes only the outer edges of the hexahedral stack. Preferably, therefore, hermetically sealing members are mounted to the opposite surfaces (b, c) to guide the coolant such that the coolant limitedly flows in a predetermined direction and, at the same time, to reduce the temperature deviation between the outer and inner rectangular battery modules.

Specifically, the hermetically sealing members, which are mounted to the opposite surfaces (b, c) of the hexahedral stack, respectively, close the opposite side surfaces of the hexahedral stack, whereby the coolant flows only through the hexahedral stack. Consequently, when the hermetically sealing members are not mounted, relatively rapid cooling of the outer rectangular battery modules, which are exposed outward, is prevented. Generally, rapid cooling of the battery modules is preferred. However, the high cooling rate of some battery modules in a middle- or large-sized battery system causes unbalance between the battery modules, and the unbalance between the battery modules eventually accelerates the degradation of the battery cells. Consequently, the hermetically sealing members form a channel for the coolant (air) and, at the same time, serve to increase the uniformity between the battery modules.

Preferably, the hermetically sealing members are constructed in a structure in which the hermetically sealing members are bent to form a coolant flow channel at the inside opposite to the battery modules. Also, the hermetically sealing members are preferably made of an insulating material to further increase the uniformity between the battery modules, as described above. Especially, the hermetically sealing members are made of a foamed resin to increase an insulation property of the battery module assembly while minimizing the total weight of the battery module assembly.

The battery modules are connected to an external circuit via the PSM. Consequently, the final input and output terminals of the battery modules are connected to the PSM, and the electrical connection between the battery modules and the external circuit is accomplished through the PSM.

In a preferred embodiment, when the input and output terminals of the battery modules protrude to a predetermined region of the insulative substrate at the surface (a) of the hexahedral stack, constituted by the battery modules, the service plug is located at the opposite side of the input and output terminals of the battery modules, the main relay is located at the central region of the insulative substrate, an external input and output terminal, through which electricity is supplied to an electric device, such as a low voltage DC-DC converter (LDC), is located at one side of the service plug, the resistance is located at the side diagonally opposite to the service plug, the free charge relay is located at the side of the service plug and above the resistance, and the current sensor is located between the main relay and the external input and output terminal. With this structure, it is possible to optimally arrange the control elements in a limited space and to minimize an electrical wiring route for connection between the control elements.

The connection members are members for electrically interconnecting the control elements. For example, the connection members may be bus bars or wires. Preferably, bus bars, which are made of a metal plate, are used as the connection members such that the plurality of control elements (the main relay, the free charge relay, the service plug, the external input and output terminal, the resistance, and the current sensor), mounted on the substrate, constitute a compact connection structure.

When electricity having an overcurrent and overvoltage is applied to the battery modules or electricity having an overcurrent and overvoltage is generated from the battery modules, the power switching module according to the present invention serves to interrupt such an overcurrent and overvoltage. Also, when the inspection or replacement of the battery modules is necessary, the power switching module according to the present invention serves to cause the occurrence of a short circuit. Consequently, it is positively necessary for the cathodes and/or the anodes of the battery modules to be connected to the external circuit via the power switching module.

Specifically, one of the input and output terminals of each rectangular battery module, i.e., the cathode or the anode of each rectangular battery module, may construct a connection circuit having a sequence of the service plug, the main relay, the free charge relay, the current sensor, and the external input and output terminal, and the other input and output terminal of each rectangular battery module, i.e., the anode or the cathode of each battery module, may construct a connection circuit only having a sequence of the service plug and the external input and output terminal. The electrode passing through the plurality of control elements may be the cathode or the anode.

Preferably, when the substrate is mounted on the surface (a) of the hexahedral stack, constituted by the battery modules, the external input and output terminal and the service plug of the PSM are located together such that the service plug and the external input and output terminal are exposed to the side of the substrate. Consequently, even when the PSM is assembled in a state in which all the other sides of the substrate are hermetically sealed or the access to the substrate is structurally difficult, the access to the service plug and the external input and output terminal is possible through the open one side of the substrate. Consequently, the flexibility in designing the apparatus is increased, and the electrical connection work or the short circuiting work is easily performed, if necessary.

The frame member, which fixes the outer edges of the hexahedral stack, constituted by the rectangular battery modules, may be constructed in various structures. For example, the frame member may be constructed in a structure in which all frames for fixing twelve edges of the hexahedral stack are integrally formed or in which frames for fixing at least four edges of the hexahedral stack constituting one surface of the hexahedral stack are integrally formed.

Preferably, the frame member is constructed in a structure in which frames for fixing every four edges of the hexahedral stack located at opposite surfaces in the transverse direction are integrally formed, and the remaining individual frames are coupled to the integrated frames. In this coupling structure, the individual frames, for example, are used by twos such that the upper-row battery modules are fixed as a set, the lower-row battery modules are also fixed as another set, and the two integrated frames are coupled to the individual frames, whereby the assembly process of the battery module assembly is easily performed, and therefore, the assembly efficiency is improved.

As described above, the insulative substrate, on which the control elements and the connection members are mounted, may be coupled and mounted to the surface of the surface (a) of the hexahedral stack, constituted by the battery modules, i.e., the surface of the hexahedral stack where the input and output terminals of the rectangular battery modules are oriented, in various structures. Preferably, coupling parts protrude from opposite lateral sides of the substrate, and the substrate is stably mounted at the open right side of the frame member, including the integrated front frame, the integrated rear frame, the upper right frame, and the lower right frame, using coupling members, such as bolts.

In this mounting structure, therefore, the insulative substrate not only provides a space for allowing the control elements and the connection members to be received therein, but also serves as a structural body for supporting the frame member.

The middle- or large-sized battery module assembly includes a battery management system (BMS) for controlling the operation of the battery modules. According to circumstances, the BMS is further included in the PSM according to the present invention. Specifically, the BMS may be mounted together with the control elements and the connection members on the insulative substrate coupled to the frame member which fixes the edges of the hexahedral stack at one surface of the hexahedral stack, constituted by the battery modules.

In accordance with another aspect of the present invention, there is provided a battery module assembly including the power switching module. Specifically, the battery module assembly according to the present invention includes rectangular battery modules, constituting a hexahedral stack, where the charge and discharge are performed, and a PSM mounted to one side of the hexahedral stack.

The battery module assembly according to the present invention may be used as a power source for electric vehicles or hybrid electric vehicles, which have a limited installation space and are exposed to frequent vibration and strong impact, in consideration of the installation efficiency and structural stability of the battery module assembly. Preferably, the battery module assembly according to the present invention is used as a power source for hybrid electric vehicles.

In accordance with a further aspect of the present invention, there is provided a hybrid electric vehicle including the battery module assembly as a power source. The hybrid electric vehicle, including the battery module assembly that can be charged and discharged, is well known in the art to which the present invention pertains, and therefore, a detailed description thereof will not be given.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
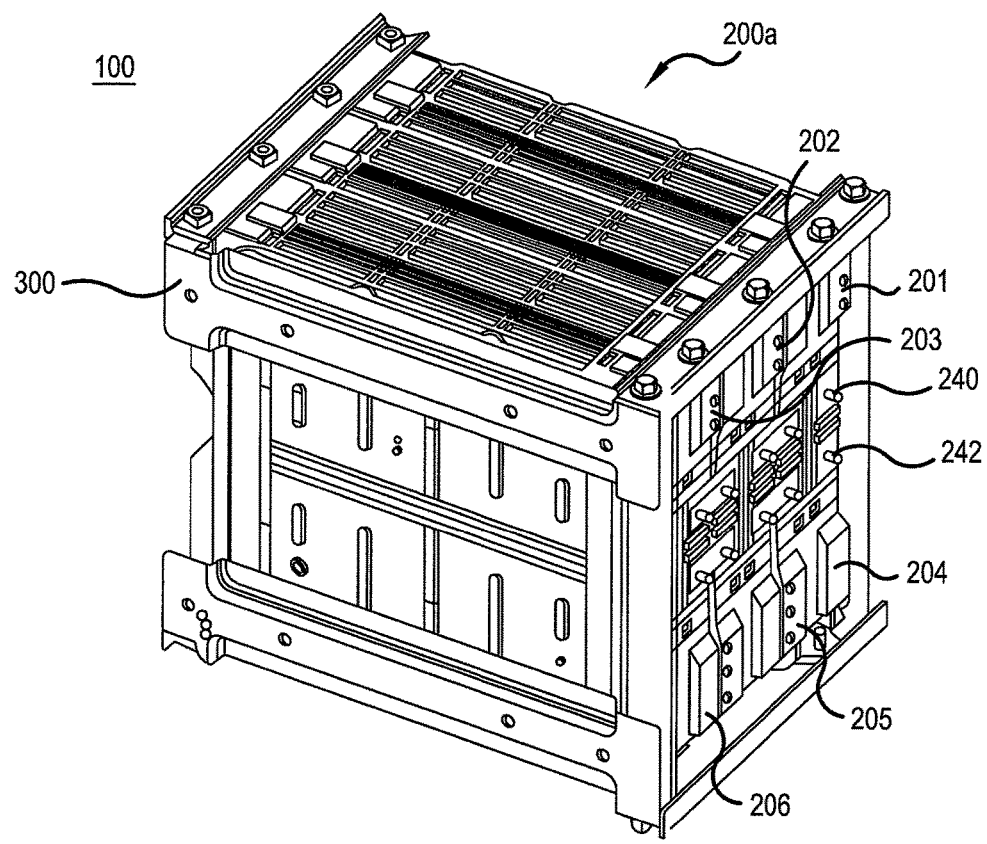
FIG. 1 is a perspective view illustrating a battery module assembly constructed in a structure in which rectangular battery modules, which constitute a hexahedral stack, are fixed by a frame member.
Figure 2:
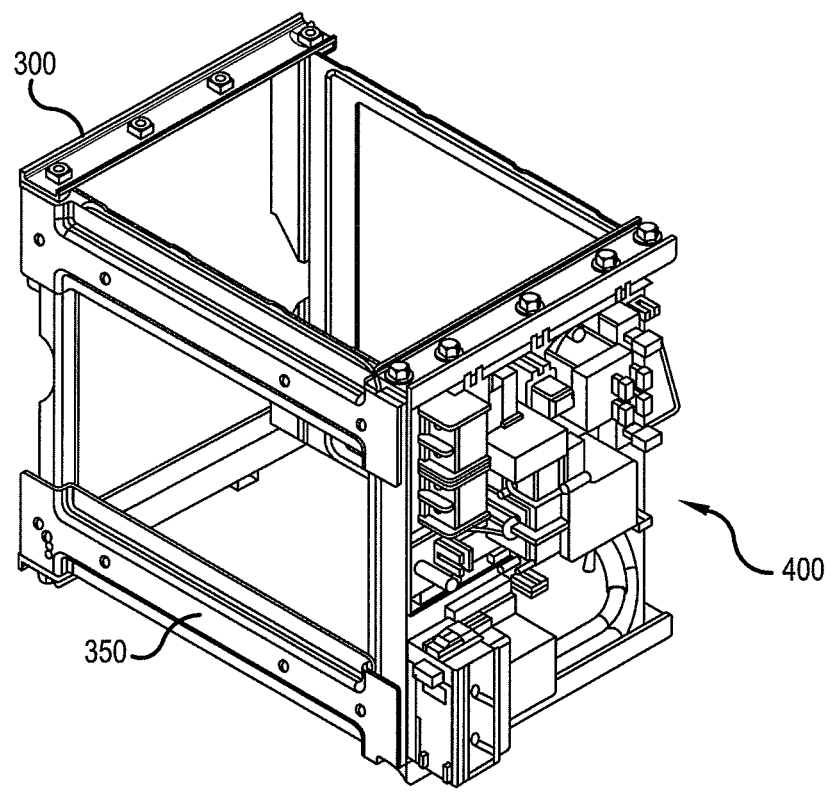
FIG. 2 is a perspective view illustrating a structure in which a power switching module (PSM) is mounted to one side of the frame member while the hexahedral stack is removed from the battery module assembly of FIG. 1.
Figure 3:
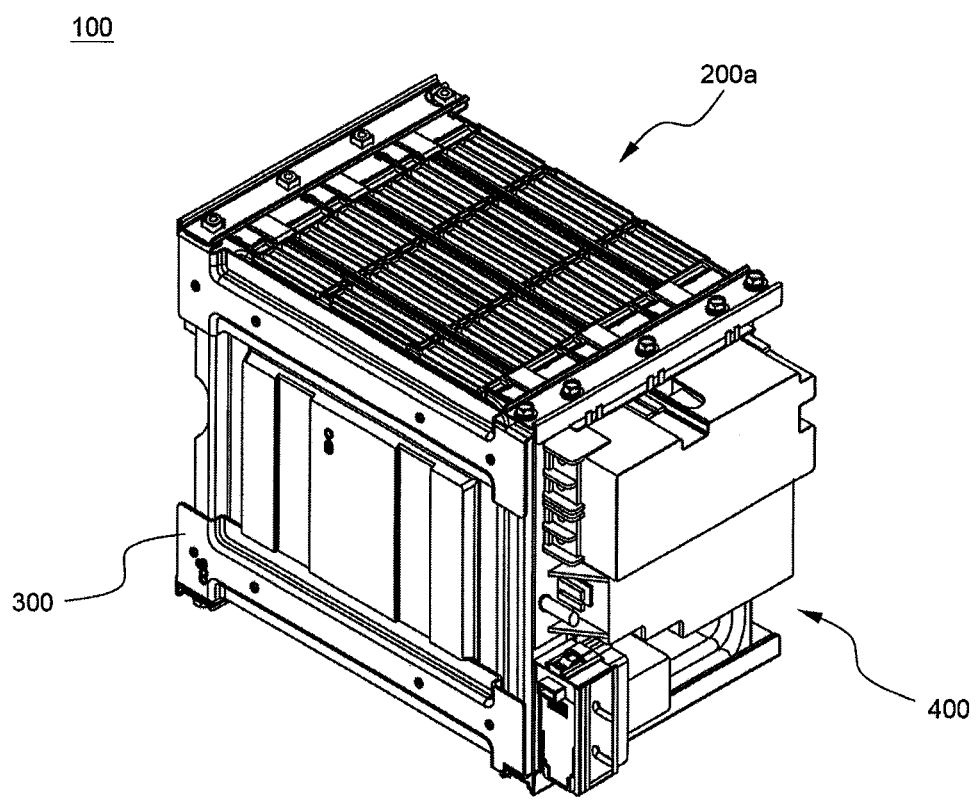
FIG. 3 is a front perspective view illustrating the PSM and a battery management system (BMS) mounted to one side of the hexahedral stack in the battery module assembly of FIG. 1.
Figure 4:
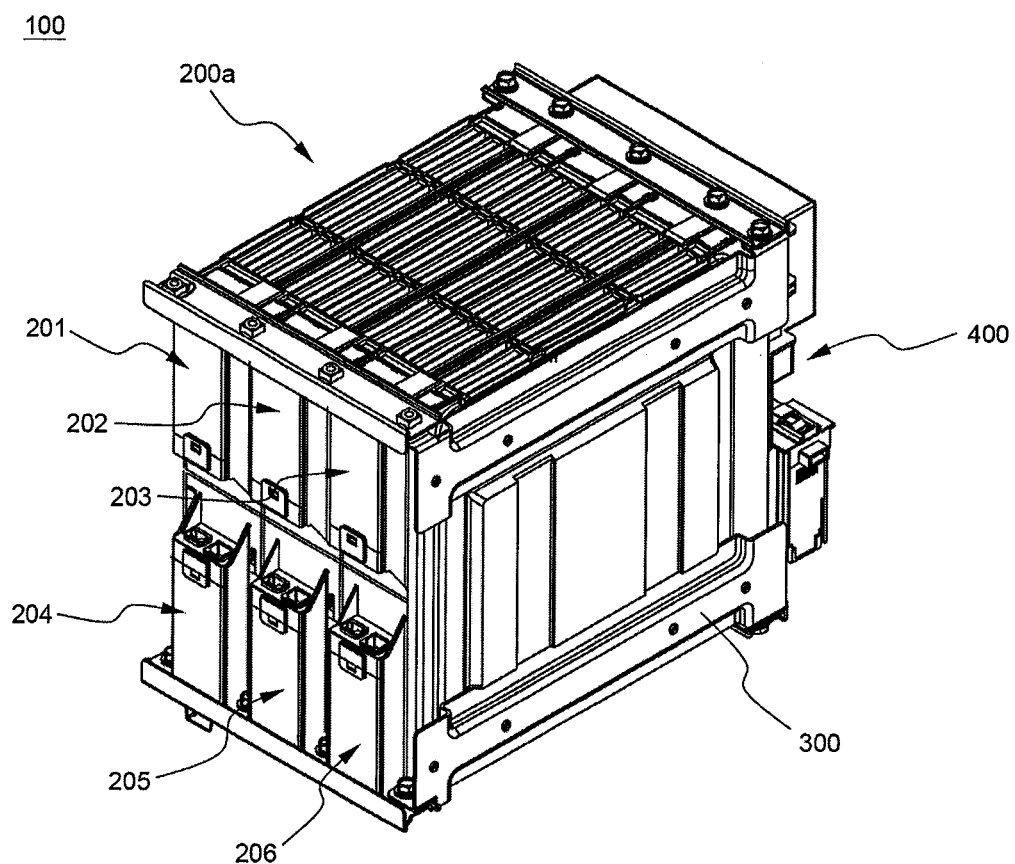
FIG. 4 is a rear perspective view of FIG. 3.

FIG. 1 is a perspective view typically illustrating a battery module assembly according to a preferred embodiment of the present invention constructed in a structure in which rectangular battery modules, which constitute a hexahedral stack, are fixed by a frame member. For convenience of easy understanding, FIG. 2 is a perspective view typically illustrating a structure in which a power switching module (PSM) is mounted to one side of the frame member while the hexahedral stack is removed from the battery module assembly of FIG. 1. Also, FIG. 3 is a front perspective view typically illustrating the PSM and mounted to one side of the hexahedral stack in the battery module assembly of FIG. 1, and FIG. 4 is a rear perspective view of FIG. 3.

Referring to these drawings, the battery module assembly 100 includes six rectangular battery modules 201, 202, 203, 204, 205, and 206, a frame member 300 for fixing outer edges of a hexahedral stack 200a, which is constituted by the six rectangular battery modules 201, 202, 203, 204, 205, and 206, and a PSM 400. The battery module assembly 100 is generally constructed in the shape of a rectangular parallelepiped.

The six rectangular battery modules 201, 202, 203, 204, 205, and 206 are arranged in a structure in which the six rectangular battery modules 201, 202, 203, 204, 205, and 206 are stacked by twos in the transverse direction, and the six rectangular battery modules 201, 202, 203, 204, 205, and 206 are stacked by threes in the longitudinal direction. Also, the six rectangular battery modules 201, 202, 203, 204, 205, and 206 are stacked in a facing arrangement structure in which input and output terminals 240 formed at one side of the six rectangular battery modules 201, 202, 203, 204, 205, and 206 are adjacent to each other. Specifically, the upper-row battery modules 201, 202, and 203 are stacked on the lower-row battery modules 204, 205, and 206 while the upper-row battery modules 201, 202, and 203 are upside down such that the upper-row battery modules 201, 202, and 203 are symmetrical to the lower-row battery modules 204, 205, and 206 about an imaginary central line.

Each of the rectangular battery modules 201, 202, 203, 204, 205, and 206 is constructed in a structure in which a plurality of plate-shaped unit modules are mounted in each of the rectangular battery modules 201, 202, 203, 204, 205, and 206 while the plate-shaped unit modules are erected. The frame member 300 is constructed in a structure in which a plurality of frames are coupled to each other such that twelve outer edges of the hexahedral stack 200a are stably fixed by the frames. While the hexahedral stack 200a is mounted in the frame member 300, six faces of the hexahedral stack 200a are exposed to the outside.

The PSM 400 is mounted on the front of the hexahedral stack 200a, where the input and output terminals 240 are located, for conducting current to perform charge and discharge, if necessary, performing appropriate voltage drop during the commencement of the operation of the battery system or the disassembly of the battery system, performing electrical connection with the rectangular battery modules, and protecting a circuit from overcurrent or overvoltage. Since the input and output terminals 240 of the rectangular battery modules 201, 202, 203, 204, 205, and 206 are adjacent to each other, the connection of the PSM 400 is easily accomplished, and it is possible to greatly reduce the length of a member for electrical connection. Also, the PSM 400 is mounted in such a manner that the PSM 400 hermetically seals the input and output terminals 240. Consequently, it is possible to prevent the occurrence of a short circuit, which may be caused due to the exposure of the input and output terminals 240. Also, it is possible to prevent the input and output terminals 240, which are structurally weak, from being deformed by an external force. Specifically, the PSM 400 also serves as a kind of protecting member for protecting the input and output terminals 240 of the rectangular battery modules 201, 202, 203, 204, 205, and 206. The details of the PSM 400 will be described hereinafter in detail with reference to FIGS. 5 and 6.

Figure 5:
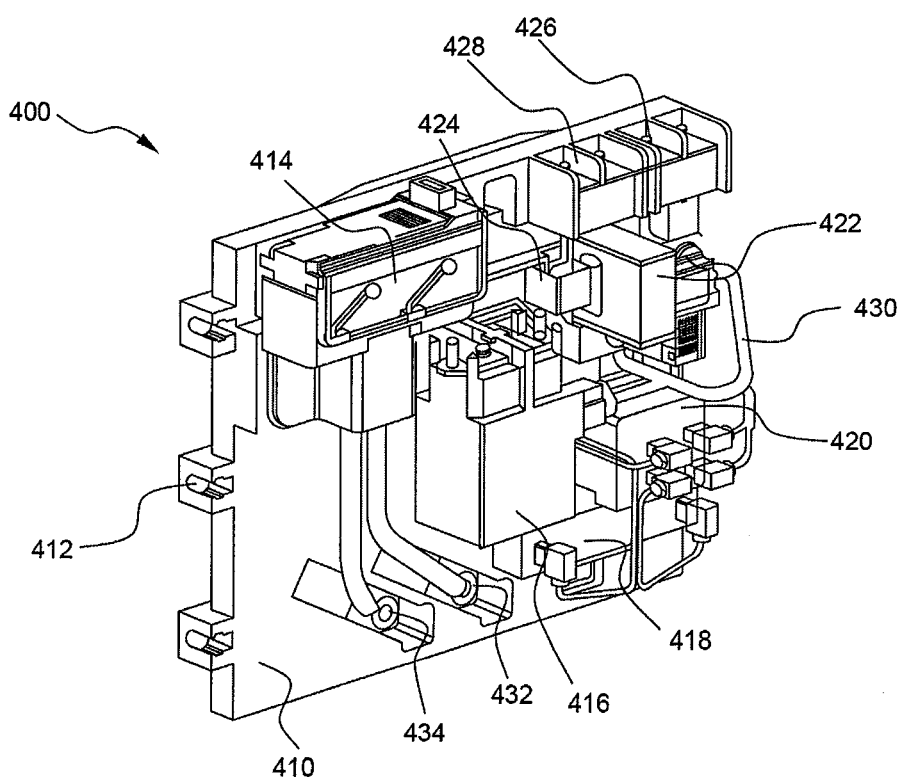
FIGS. 5 and 6 are a perspective view and a plan view illustrating the structure of the PSM shown in FIG. 3, respectively.
Figure 6:
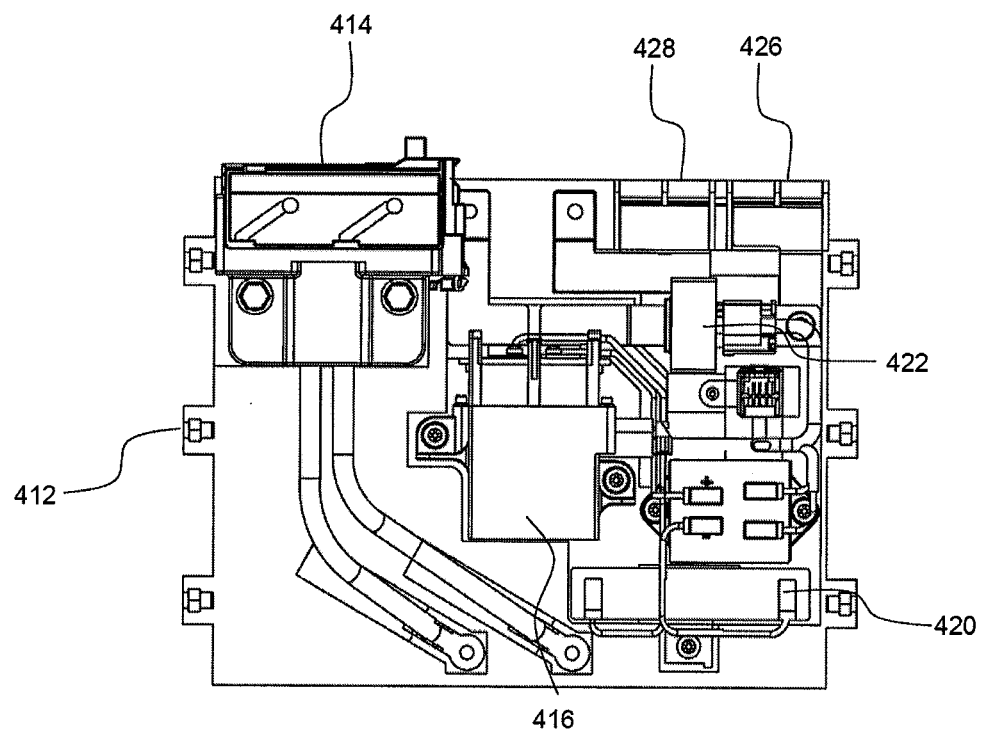

FIGS. 5 and 6 typically illustrate the structure of a PSM according to a preferred embodiment of the present invention.

Referring to these drawings, the PSM 400 is constructed in a structure in which various control elements are mounted on an insulative thick plastic substrate 410, and the control elements are connected to each other via a bus bar 424 and a wire 430.

When the introduction position of the wire connected to the input and output terminals of the battery modules is the lower side of the substrate 410, a service plug 414 is located at the upper side of the substrate 410, a main relay 416 is located at the central region of the substrate 410, a free charge relay 420 is located at the opposite side of the substrate 410 corresponding to the wire, a resistance 418 is located below the free charge relay 420, and a current sensor 422 is located above the free charge relay 420. Consequently, the PSM 400 is constructed in a compact structure that can be mounted in a limited space.

An external input and output terminal is located at one side of the service plug 414. A cathode external input and output terminal 426 and an anode external input and output terminal 428 are connected to a different electric device (not shown), such as an inverter and a low voltage DC-DC converter (LDC), via a connection member, such as a cable or wire.

The cathode input and output terminals 240 of the battery modules, which constitute the hexahedral stack 200a of FIG.

1, are connected to a cathode connection terminal 432, which is connected to the service plug 414, and are connected to the cathode external input and output terminal 426 through the main relay 416, the free charge relay 420, and the current sensor 422. On the other hand, the anode input and output terminals 242 of the battery modules, are connected to an anode connection terminal 434, which is connected to the service plug 414, and are directly connected to the anode external input and output terminal 428, not through the control elements. Consequently, when one of the control elements, constituting the PSM, i.e., the service plug 414, the main relay 416, and the free charge relay 420 are turned off, a short circuit occurs.

The service plug 414 serves to cause the occurrence of a short circuit, if necessary, so as to secure the safety of an operator and the system during the assembly and inspection of the battery module assembly or during the replacement of the battery modules or some of the control elements.

When the electricity applied to the battery modules or the electricity generated from the battery modules has a current or voltage exceeding a prescribed value, the main relay 416 serves to interrupt such a high current or voltage to secure the safety of the system.

The free charge relay 420 and the resistance 418, which is cooperated with the free charge relay 420, serve to allow electricity having an appropriated dropped voltage and current to be conducted such that the system is prevented from being overloaded due to instantaneous current conduction, when the current is conducted while the system is stopped, for example, when the vehicle is started. Consequently, when the vehicle is started, the free charge relay 420 is operated, and, when reaching an appropriate operating condition, the free charge relay 420 is not operated any longer.

On the other hand, the insulative plastic substrate 410 is constructed in a structure in which the insulative plastic substrate 410 has a shape and size to be exactly mounted at the open right side of the frame member including an integrated front frame, an integrated rear frame, an upper right frame, and an upper lower frame as shown in FIG. 2, and coupling parts 412 protrude from opposite lateral sides of the insulative plastic substrate 410. As a result, at least two edges of the insulative plastic substrate 410 are stably coupled to the frame member on one side of the battery module assembly.

Consequently, the plastic substrate 410 of the PSM 400 not only provides a space for allowing the related elements, the bus bar, and the wire to be received therein, but also serves as a structural body for supporting the frame member.

Figure 7:
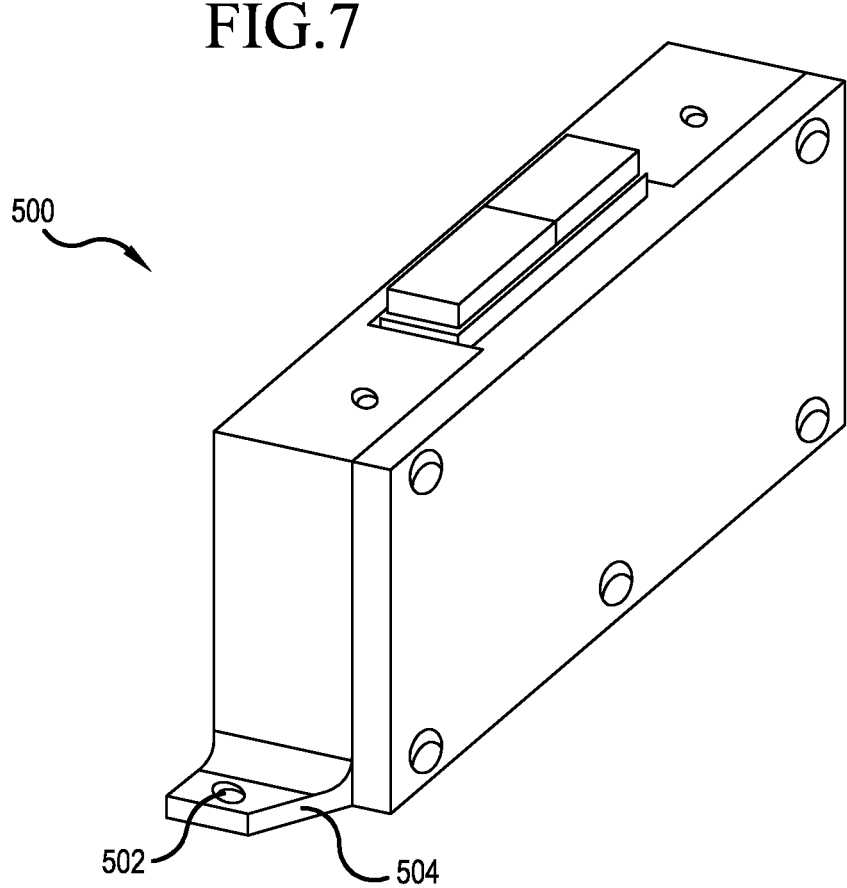
FIG. 7 is a perspective view illustrating the structure of the BMS shown in FIG. 3.

FIG. 7 is a perspective view typically illustrating the structure of a battery management system (BMS).

Referring to FIG. 7, the BMS 500 is mounted at a position where the PSM is mounted in a housing case of the battery module assembly such that the BMS 500 is adjacent to the LDC and the inverter. At the lower part of one side of the BMS 500 is formed a coupling part 504, which protrudes outward from the BMS 500. The BMS 500 is fixed to a predetermined region of the battery module assembly by threadedly engaging a coupling member, such as a bolt, into a coupling hole 502 of the coupling part 504. The position where the BMS 500 is mounted may be variously changed. Preferably, the BMS 500 is mounted at the position where the PSM is mounted as shown in FIG. 8.

Figure 8:
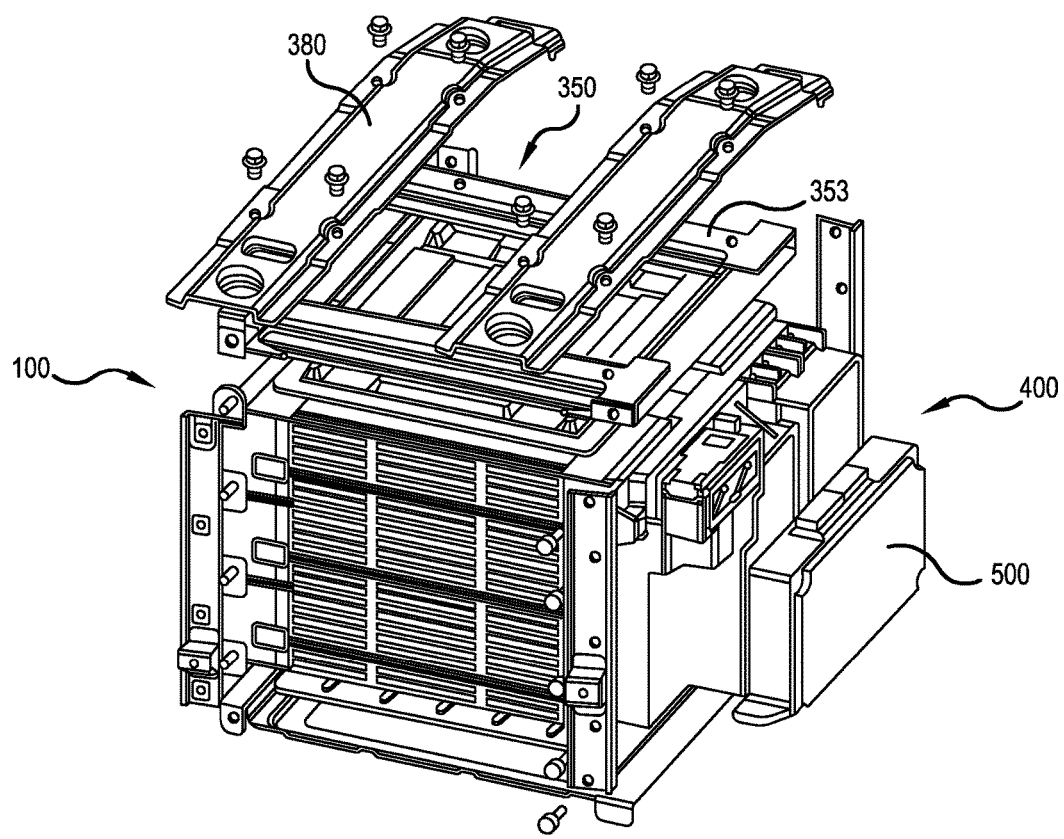
FIG. 8 is an exploded perspective view illustrating the coupling between the battery module assembly and a vehicle mounting frame.

FIG. 8 is an exploded perspective view illustrating the coupling between the battery module assembly and a mounting frame member.

Referring to FIG. 8, the mounting frame member 380 is constructed in a structure in which the mounting frame member 380 is gently bent such that the mounting frame member 380 protrudes outward while opposite ends of the mounting frame member 380 are coupled to a bent extension part 353 of an integrated front frame 350. Also, the mounting frame member 380 is provided with coupling grooves for coupling an external apparatus or device (not shown) in addition to coupling grooves for coupling with the front frame 350.

Consequently, the battery module assembly 100 is effectively mounted to the external apparatus or device by the mounting frame member 380, while the PSM 400 and BMS 500 are mounted at one side of the battery module assembly 100.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the power switching module for battery module assemblies according to the present invention has a compact and optimum arrangement structure in which the power switching module is stably mounted in a limited space, such as an electric vehicle or a hybrid electric vehicle, while the power switching module has a minimum space occupation. Furthermore, the power switching module is easily assembled and has a high structural stability against external impacts.

The invention claimed is:
1. A battery module assembly comprising:
a hexahedral stack arrangement of a plurality of rectangular battery modules, each battery module having a case and a plurality of battery cells or unit modules connected in series to each other inside the case, the battery modules being stacked by two or more in a longitudinal direction thereof and by two or more in a transverse direction perpendicular to the longitudinal direction thereof such that the cases of the battery modules adjacent to each other in the longitudinal direction and in the transverse direction are in direct contact with each other, and outer edges of the hexahedral stack are located at the perimeter of the hexahedral stack;
a frame member fixing the outer edges of the hexahedral stack, the frame member having six sides defined by outer edges corresponding to the outer edges of the hexahedral stack such that the six sides of the hexahedral stack correspond to the six sides of the frame member, each side of the frame member providing an opening in the corresponding side of the frame member such that the corresponding side of the hexahedral stack is exposed therethrough; and
mounting frames each having coupling parts, through which the battery module assembly is mounted to an external device, formed at opposite ends thereof is provided at a part of the frame member to fix edges of one side of the hexahedral stack, the frame member being located between the hexahedral stack and the mounting frames,
wherein the mounting frames comprise two plate-shaped members configured to have a structure in which the plate-shaped members are bent so that the coupling parts of the plate-shaped members protrude outward from the mounting frame away from the hexahedral stack mounted in the frame member in a state in which ends of the plate-shaped members are coupled to the frame member such that one of the six sides of the battery module assembly is securely coupled to the external device.

2. The battery module assembly according to claim 1, wherein the hexahedral stack is configured to have a structure in which two rectangular battery modules are arranged in the transverse direction so that the rectangular battery modules are opposite to each other, and one or more rectangular battery modules are arranged in the longitudinal direction with respect to the respective rectangular battery modules.

3. The battery module assembly according to claim 1, wherein each of the rectangular battery modules has a greater height than a width thereof, and the hexahedral stack has a rectangular parallelepiped structure.

4. The battery module assembly according to claim 1, wherein each of the unit modules is configured to have a structure in which plate-shaped battery cells, each of which has electrode terminals formed at the upper end and the lower end thereof, are connected in series to each other, and each of the unit modules comprises two or more battery cells, in which connection parts between the electrode terminals are bent so that the battery cells are stacked, and a cell cover coupled to outer sides of the battery cells excluding regions of the electrode terminals so as to cover the outer sides of the battery cells.

5. The battery module assembly according to claim 1, wherein input and output terminals of the rectangular battery modules are oriented so that the input and output terminals of the rectangular battery modules are directed toward one side of the hexahedral stack.

6. The battery module assembly according to claim 5, wherein a power switching module (PSM) and a battery management system (BMS) are mounted to one side of the hexahedral stack.

7. The battery module assembly according to claim 5, wherein the battery cells or the unit modules in each of the rectangular battery modules are arranged in parallel to a pair of opposite sides of the hexahedral stack, and hermetically sealing members are mounted to the opposite sides.

8. The battery module assembly according to claim 7, wherein each of the hermetically sealing members is bent so that a coolant flow channel is formed at the inner side of each of the hermetically sealing members facing a corresponding one of the rectangular battery modules.

9. The battery module assembly according to claim 7, wherein each of the hermetically sealing members is formed of an insulating material.

10. The battery module assembly according to claim 1, wherein the frame member is configured to have a structure in which all frames to fix twelve edges of the hexahedral stack are integrally formed or in which frames to fix at least four edges of the hexahedral stack constituting one side of the hexahedral stack are integrally formed.

11. The battery module assembly according to claim 10, wherein the frame member is configured to have a structure in which frames to fix every four edges of the hexahedral stack located at a pair of sides opposite to each other are integrally formed, and the remaining individual frames are coupled to the integrally formed frames.

12. The battery module assembly according to claim 11, wherein hermetically sealing members are mounted to the integrally formed frames.

13. The battery module assembly according to claim 11, wherein the individual frames are used by twos so that upper-row rectangular battery modules of the plurality of rectangular battery modules are fixed as a set, lower-row rectangular battery modules of the plurality of rectangular battery modules are also fixed as another set, and the two integrally formed frames are coupled to the individual frames.

14. The battery module assembly according to claim 1, wherein the PSM and the BMS are configured to have a structure in which safety elements and control elements are disposed at a plate fastened to a part of the frame member to fix edges of one side of the hexahedral stack.

15. A middle or large-sized battery pack comprising the battery module assembly according to claim 1.

16. The middle or large-sized battery pack according to claim 15, wherein the battery pack is used as a power source for electric vehicles or hybrid electric vehicles.

17. A battery module assembly comprising:
a hexahedral stack arrangement of a plurality of rectangular battery modules, each battery module having a case and a plurality of battery cells or unit modules connected in series to each other inside the case, the battery modules being stacked by two or more in a longitudinal direction thereof and by two or more in a transverse direction perpendicular to the longitudinal direction thereof such that the cases of the battery modules adjacent to each other in the longitudinal direction and in the transverse direction are in direct contact with each other, and outer edges of the hexahedral stack are located at the perimeter of the hexahedral stack
a frame member fixing the outer edges of the hexahedral stack, the frame member having six sides defined by outer edges corresponding to the outer edges of the hexahedral stack such that the six sides of the hexahedral stack are exposed through corresponding sides of the frame member; and
mounting frames each having coupling parts, through which the battery module assembly is mounted to an external device, formed at opposite ends thereof is provided at a part of the frame member to fix edges of one side of the hexahedral stack, the frame member being located between the hexahedral stack and the mounting frames,
wherein the mounting frames comprise two plate-shaped members configured to have a structure in which the plate-shaped members are bent so that the coupling parts of the plate-shaped members protrude outward from the mounting frame away from the hexahedral stack mounted in the frame member in a state in which ends of the plate-shaped members are coupled to the frame member such that one of the six sides of the battery module assembly is securely coupled to the external device, and
wherein the outer edges of the frame member includes four upper edges defining an upper plane, four lower edges defining a lower plane substantially parallel to the upper plane, and four side edges extending between the upper plane and the lower plane to define four side planes extending substantially perpendicular to the upper plane.

18. The battery module assembly of claim 1, wherein each of the outer edges of the frame member is longer than the corresponding outer edge of the hexahedral stack.

* * * * *